United States Patent
Dunne et al.

(10) Patent No.: US 10,594,693 B2
(45) Date of Patent: *Mar. 17, 2020

(54) ELECTRONIC DEVICE IDENTIFICATION

(71) Applicant: International Business Machines Corporation, Armonk, NY (US)

(72) Inventors: Jonathan Dunne, Dungarvan (IE); Liam Harpur, Dublin (IE); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/041,927

(22) Filed: Jul. 23, 2018

(65) Prior Publication Data

US 2019/0007405 A1 Jan. 3, 2019

Related U.S. Application Data

(63) Continuation of application No. 15/271,557, filed on Sep. 21, 2016, now Pat. No. 10,069,825, which is a
(Continued)

(51) Int. Cl.
*H04L 29/06* (2006.01)
*G06F 16/955* (2019.01)
(Continued)

(52) U.S. Cl.
CPC ...... *H04L 63/0876* (2013.01); *G06F 12/1416* (2013.01); *G06F 16/9017* (2019.01);
(Continued)

(58) Field of Classification Search
CPC .......... G06F 21/44–21/445; G06F 2221/2129; H04L 9/32; H04L 9/3278; H04L 9/0861; H04L 9/0866; H04L 63/08; H04L 63/0876
See application file for complete search history.

(56) References Cited

U.S. PATENT DOCUMENTS 7,917,741 B2 3/2011 Dutton et al.
7,921,303 B2 4/2011 Mauro, II
(Continued)

FOREIGN PATENT DOCUMENTS

WO 2009064131 A2 5/2009
WO 2013173729 A1 11/2013

OTHER PUBLICATIONS

Jakobsson et el. "Unspoofable Device Identity Using NAND Flash Memory". Published: Oct. 14, 2010, <http://www.securityweek.com/unspoofable-device-identity-using-nand-flash-memory> (Year: 2010).*
(Continued)

*Primary Examiner* — Kevin Bechtel
(74) *Attorney, Agent, or Firm* — Alexander G. Jochym; William H. Hartwell (57) ABSTRACT

A tool for generating an identifier for an electronic device. The tool identifies a target memory segment. The tool accesses the target memory segment utilizing an access procedure. The tool corrupts the target memory segment, wherein corrupting includes exposing the target memory segment to one or more degrading programming cycles with a heightened frequency to degrade and corrupt the target memory segment on the electronic device to cause degradation and corruption of the electronic device, identifying one or more memory locations in the plurality of memory locations that are unused, and marking the one or more memory locations as corruptible. The tool monitors one or more execution behavioral properties, the one or more execution behavioral properties being associated with execution of the access procedure. The tool generates a device identifier based, at least in part, on the one or more execution behavioral properties.

20 Claims, 3 Drawing Sheets

Related U.S. Application Data continuation of application No. 14/837,335, filed on Aug. 27, 2015, now Pat. No. 10,057,260.

(51) Int. Cl.
  *G06F 16/901* (2019.01)
  *G06F 12/14* (2006.01)
  *G06F 21/44* (2013.01)
  *G06F 21/78* (2013.01)

(52) U.S. Cl.
  CPC ............ *G06F 16/955* (2019.01); *G06F 21/44* (2013.01); *G06F 21/78* (2013.01); *H04L 63/08* (2013.01); *H04L 63/102* (2013.01); *G06F 2212/1052* (2013.01); *G06F 2221/2129* (2013.01); *G06F 2221/2139* (2013.01)

(56) References Cited

U.S. PATENT DOCUMENTS

| | | | |
|---|---|---|---|
| 8,458,791 | B2 | 6/2013 | Do et al. |
| 8,694,767 | B2 | 4/2014 | Rodgers et al. |
| 8,732,442 | B2 | 5/2014 | Wolczko et al. |
| 8,965,340 | B1 | 2/2015 | Biger-Levin et al. |
| 9,015,842 | B2 | 4/2015 | Troyansky et al. |
| 2011/0252189 | A1* | 10/2011 | Kang .................. G06F 12/0246 711/103 |
| 2013/0159729 | A1 | 6/2013 | Thom et al. |
| 2016/0357982 | A1* | 12/2016 | Hassanzadeh ...... G06F 21/6218 |

OTHER PUBLICATIONS

Cai, et al., "Error Patterns in MLC NAND Flash Memory: Measurement, Characterization, and Analysis", Department of Electrical and Computer Engineering, Carnegie Mellon University, Pittsburgh, PA, LSI Corporation, 1110 American Parkway NE, Allentown, PA, pp. 1-6, 978-3-9810801-8-6/DATE12/ Copyright 2012 EDAA.

Jakobbson, Markus, "Unspoofable Device Identity Using NAND Flash Memory", Oct. 14, 2014, Security Week, pp. 1-6, printed on Aug. 26, 2015, <http://www.securityweek.com/unspoofable-device-identity-using-nand-flash-memory>.

Prabuh, et al, "Extracting Device Fingerprints From Flash Memory by Exploiting Physical Variations", UC San Diego, La Jolla, CA 92093, Cornell University, Ithaca, NY 14853, pp. 1-17, captured Apr. 29, 2015, <http://cseweb.ucsd.edu/~swanson/papers/TRUST2011FPUFs.pdf>.

Rouse, Margaret, "What Is Masquerade", Tech Target, Search Security, pp. 1-7, printed on Aug. 14, 2015, <http://searchsecurity.techtarget.com/definition/masquerade>.

Wang, et al., "Flash Memory for Ubiquitous Hardware Security Functions: True Random Number Generation and Device Fingerprints", School of Electrical and Computer Engineering, Cornell University, Ithaca, NY, USA, captured Apr. 29, 2015, pp. 1-15 <http://tsg.ece.cornell.edu/lib/exe/fetch.php?media=pubs:flash-ieeesp2012.pdf>.

"IronKey F200 Flash Drives—Data Worth Protecting is Worth Protecting with IronKey F Series Flash Drives", IronKey by imation, pp. 1-4, printed on Aug. 14, 2015, <http://www.ironkey.com/en-US/encrypted-storage-drives/f200.html>.

"Two-Factor Authentication", From Wikipedia, the free encylopedia, printed Aug. 14, 2015, pp. 1-2, this page last modified on Aug. 12, 2015, <http://en.wikipedia.org/wiki/Two_factor_authentication>.

"Identity Theft or Masquerading—Computer Definition", Your Dictionary, The Dictionary You Can Understand, pp. 1-9, Copyright 1996-2015 LoveToKnow, Corp., Printed on Aug. 14, 2015, <http://www.yourdictionary.com/identity-theft-or-masquerading>.

List of IBM Patents or Patent Applications Treated as Related, Appendix P, Filed Herewith, 2 pages.

Dunne, et al., "Electronic Device Identification", U.S. Appl. No. 15/271,557, filed Sep. 21, 2016.

Dunne, et al., "Electronic Device Identification", U.S. Appl. No. 14/837,335, filed Aug. 27, 2015.

"NAND Flash Bad Block Table", OLPC, pp. 1-4, printed on Aug. 14, 2015, <http://wiki.laptop.org/go/NAND_Flash_Bad_Block_Table>.

\* cited by examiner

FIG. 3

ELECTRONIC DEVICE IDENTIFICATION

BACKGROUND

The present invention relates generally to security of electronic devices and computer systems, and more specifically to electronic device identification and authentication.

Identity theft is a problem prevalent in modern society. Where electronic communications are concerned, identity theft may manifest itself by the use of user credentials or masquerading of device credentials by a third person, that is, a person other than the user. This poses a security risk as such a third person can maliciously gain access to services or data that are confidential or otherwise restricted.

SUMMARY

Embodiments of the present invention disclose a method, computer program product, and computer system for generating an identifier for an electronic device. The method includes identifying, by one or more computer processors, a target memory segment. The method includes accessing, by the one or more computer processors, the target memory segment utilizing an access procedure. The method includes corrupting, by the one or more computer processors, the target memory segment, wherein the target memory segment includes a subset of a plurality of memory locations unique to an electronic device, wherein corrupting includes exposing the target memory segment to one or more degrading programming cycles with a heightened frequency to degrade and corrupt the target memory segment on the electronic device to cause degradation and corruption of the electronic device, identifying one or more memory locations in the plurality of memory locations that are unused, and marking the one or more memory locations as corruptible. The method includes monitoring, by the one or more computer processors, one or more execution behavioral properties, the one or more execution behavioral properties being associated with execution of the access procedure. The method includes generating, by the one or more computer processors, a device identifier based, at least in part, on the one or more execution behavioral properties.

DETAILED DESCRIPTION

In the context of the present application, where embodiments of the present invention constitute a program, it should be understood that such a program is a process for execution by a computer, i.e. is a computer-implementable method. A program may comprise one or more program instructions in high-level or low-level programming languages. A program may comprise one or more machine-level instructions.

In the context of the present application, reference is made to electronic devices. Such an electronic device may be any electronic device operable by a user and capable of connecting to another electronic device for establishing a communication channel between the electronic device and the other electronic device over a network, which may be a communication channel over a wired or a wireless network. The other electronic device for instance may provide a service and/or resource to the electronic device over the established communication channel. Examples of electronic devices include but are not limited to servers, desktop computers, laptop computers, netbooks, notebooks, tablet computers, handheld or otherwise portable electronic devices including smart phones, personal digital assistants, smart glasses, smart watches, and computers integrated in vehicles, bank cards, credit cards, loyalty cards and so on.

In the context of the present application, where reference is made to a requesting electronic device, this is an electronic device that may try to establish a secure connection requiring authentication with another electronic device. Where reference is made to a remote electronic device, this is another electronic device trying to establish a communication channel with another electronic device from the perspective of the other electronic device. Where reference is made to a trusted electronic device, this is a remote electronic device for which a device identifier is known to the other electronic device with which the remote electronic device tries to establish a communication channel. Where reference is made to an arbitrating electronic device, this is an electronic device authenticating the requesting electronic device.

In the context of the present application, where reference is made to a memory location, this is a unit of memory or a cluster of units of memory that can be individually addressed or that can be addressed as a unit, e.g. a memory cell, a memory sector, a memory block and so on. Where reference is made to a target memory segment, this is a subset of the memory locations that comprises one or more memory locations corrupted and/or marked as corrupted (e.g. in a memory corruption look-up table).

Figure 1:
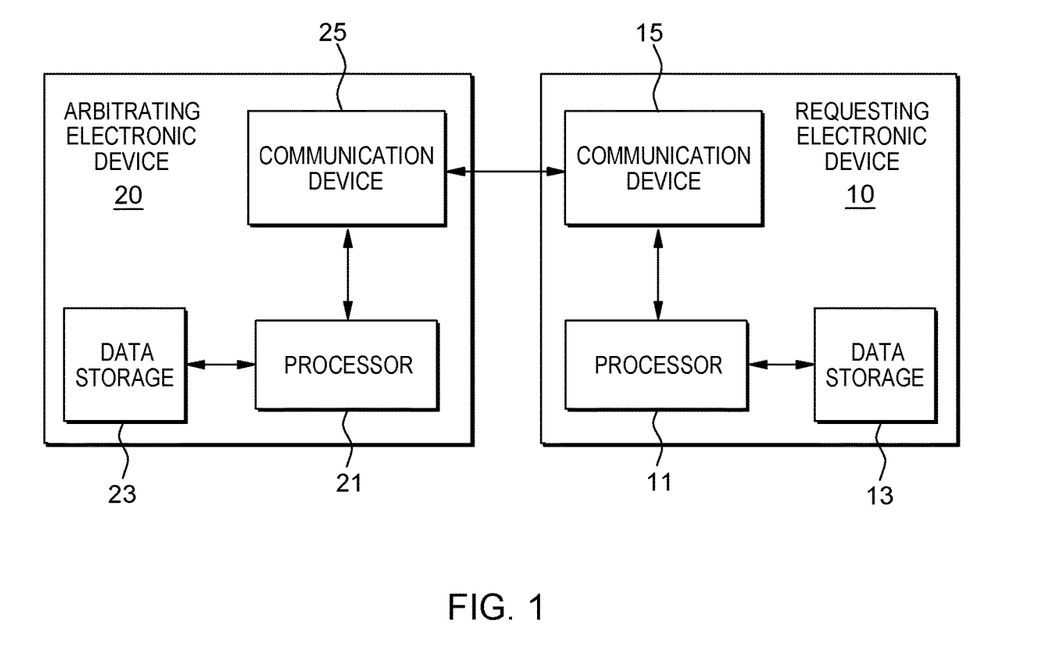
FIG. 1 depicts a communication scenario between two electronic devices, in accordance with at least one embodiment of the present invention.

FIG. 1 depicts a typical communication scenario between a requesting electronic device 10 and an arbitrating electronic device 20. The requesting electronic device 10 contacts the arbitrating electronic device 20 to establish a secure communication channel between the requesting electronic device 10 and the arbitrating electronic device 20. The purpose of the establishment of the communication channel by the requesting electronic device 10 may be to utilize a resource or service offered by the arbitrating electronic device 20. The requesting electronic device 10 may establish the communication channel to request authentication of the requesting electronic device 10 by the arbitrating electronic device.

In the latter case, the arbitrating electronic device 20 is simply implementing a registry rather than offering some resource or service to which the requesting electronic device 10 seeks access. In that context, a secure communication channel is a communication channel that is established following authentication of the requesting electronic device 10 by the arbitrating electronic device 20. In some embodiments, such authentication includes verification of one or more device identifiers generated on the requesting electronic device 10 by the arbitrating electronic device 20, as will be explained in more detail below. In addition, the authentication may further include verification of user credentials provided by a user of the requesting electronic device 10, such as a username, password or parts thereof (e.g. selected characters of the password as prompted by the arbitrating electronic device 20), answers to one or more security questions, a key generated by a dedicated key generation device, or any other suitable user authentication method. Any combination of such authentication methods may be contemplated.

In FIG. 1, the requesting electronic device 10 comprises a processor 11 communicatively coupled to an electrically erasable and programmable memory 13, e.g. a Flash memory (from here on simply referred to as memory 13), and a communication unit 15, as is commonplace in electronic devices adapted to establish communications with other electronic devices over a wired or wireless network. The processor 11 may be any suitable type of processor, such as a single processor or a processor arrangement comprising a plurality of processing units. The processor may comprise one or more processing units (including one or more multi-core processing units). The processor 11 may be a general purpose processor or may be a dedicated processor designed specifically for the electronic device 10, e.g. an ASIC. The processor 11 may be a central processing unit of the electronic device 10. Other suitable types of processors will be immediately apparent to the skilled person.

The electrically erasable and programmable memory 13 may be used in any suitable manner within the electronic device 10, e.g. a volatile data or non-volatile data storage memory, CPU cache memory, a memory storing at least part of the BIOS or the like. The processor 11 may be adapted to program and erase the memory 13. Alternatively, the memory 13 may include a memory controller responsive to the processor 11 that controls the programming and erasing of the memory locations of the memory 13.

The communication unit 15 may be any suitable type of communication unit, such as a communication unit for wired communication, e.g. an Ethernet communication unit or a communication unit for wireless communication, e.g. a IEEE 802.11 (Wi-Fi) communication unit, a Bluetooth communication unit, a 3G, 4G or 5G communication unit, a near-field communication (NFC) unit such as a radio-frequency (RF)-ID tag, and so on. The wireless communication unit may comprise an antenna unit in addition to a transmission unit and a receiver unit as is commonplace in communication units. At least part of the communication unit may be integrated in the processor 11 in some embodiments.

In FIG. 1, the arbitrating electronic device 20 comprises a processor 21 communicatively coupled to a data storage device 23 and a communication unit 25, as is commonplace in electronic devices adapted to establish communications with further electronic devices over a wired or wireless network. The processor 21 may be any suitable type of processor, such as a single processor or a processor arrangement comprising a plurality of processing units. The processor may comprise one or more processing units (including one or more multi-core processing units). The processor 21 may be a general purpose processor or may be a dedicated processor designed specifically for the electronic device 20, e.g. an ASIC. The processor 21 may be a central processing unit of the arbitrating electronic device 20. Other suitable types of processors will be immediately apparent to the skilled person.

In some embodiments, the data storage device 23 is configured to store device identifiers of one or more trusted electronic devices, such as the requesting electronic device 10. A device identifier is generated based on one or more execution behavioral properties determined from the execution of an access procedure on the processor 11 of the requesting electronic device 10. The execution of the access procedure causes the processor 11 of the requesting electronic device 10 to access a target memory segment of the requesting electronic device 10. The target memory segment is a subset of memory locations of the memory 13 of the requesting electronic device 10 corrupted and/or marked as corrupted (e.g. in a memory corruption look-up table). The device identifiers may be stored on the data storage device 23 in any suitable form, such as a lookup table or a database.

In one embodiment, the data storage 23 may further store a supplemental device identifier of the electronic device 10 based on a subset of memory locations of the memory 13 of the trusted electronic device 10 being marked as corrupted (i.e. a "target memory segment" of the requesting electronic device 10), as will be explained in further detail below.

In at least some embodiments, the device identifiers are stored together with user credential information, e.g. user name and password, optionally comprising further authentication information such as security questions and answers thereto, to authenticate a user trying to access the arbitrating electronic device 20 with a remote electronic device such as the requesting electronic device 10 through the communication unit 25 of the arbitrating electronic device 20. Any suitable type of data storage device 23 may be used for this purpose, such as a memory, hard disk, solid state disk and so on. The data storage device 23 may be integral to the arbitrating electronic device 20 or may be connected to the arbitrating electronic device 20 via a network, e.g. in case of a distributed electronic device, in which case the data storage device 23 may comprise a storage area network (SAN) or a network attached storage (NAS) device.

The communication unit 25 may be any suitable type of communication unit, such as a communication unit for wired communication, e.g. an Ethernet communication unit or a communication unit for wireless communication, e.g. an IEEE 802.11 (Wi-Fi) communication unit, a Bluetooth communication unit, a 3G, 4G or 5G communication unit, a NFC communication unit and so on. The wireless communication unit may comprise an antenna unit in addition to a transmission unit and a receiver unit as is commonplace in communication units. At least part of the communication unit may be integrated in the processor 21 in some embodiments.

As will be immediately apparent, the requesting electronic device 10 and/or the arbitrating electronic device 20 are not limited to the above building blocks and may comprise any suitable further building blocks, such as a display unit, a graphical user interface, which may be displayed on a display unit, a user interface such as a keypad, scroll ball, mouse, keyboard and so on, a data storage device such as a hard disk or solid state disk, an audio output device such as a loudspeaker, one or more interface ports such as USB ports, a power supply such as a battery, an image capturing device such as a camera, a sound capturing device such as a microphone, a global positioning satellite receiver, and so on.

The memory 13 of the requesting electronic device 10 comprises one or more memory locations that are listed as corrupted (i.e. a target memory segment). As known in the art, memory locations of certain type of electrically programmable and erasable memories, e.g. NAND-type or NOR-type Flash memories, can degrade over time through repeated use, e.g. repeated programming, which renders the memory locations unreliable and therefore unsuitable for data storage use. In some embodiments, in order to avoid data being stored in such corrupted memory locations, the requesting electronic device 10 maintains a memory corruption look-up table, which may be stored in memory or on a suitable data storage device, which lists the corrupted memory locations and replacement memory locations that have been allocated the data originally intended for the corrupted memory locations.

This behavior may be utilized to create a user-defined signature in the memory 13 by exposing selected memory locations to a sufficiently large number of programming/erasing cycles that cause the selected memory locations to become corrupted. In this manner, the memory 13 in some embodiments will comprise a plurality of contiguous or non-contiguous corrupt memory locations (i.e. a target memory segment), some of which are corrupted by 'natural' errors, i.e. errors present after manufacture of the memory 13, and some of which are 'induced' errors caused by the targeted corruption of the locations containing these errors through, for instance, degrading programming cycles.

The defined device identifier may be based on natural errors alone, but may include one or more induced errors. In one embodiment, the defined device identifier is solely based on induced errors. In this embodiment, non-induced errors, e.g. natural errors or errors caused by normal use of the memory 13, may be filtered out to obtain the device identifier. The non-induced errors may be considered background noise to the device identifier (the user-induced corrupt memory cells), and may be measured, e.g. by counting, to be used as an additional verification measure. In some embodiments of the present invention, where a memory 13 contains a suspiciously high amount of background noise, this may indicate tampering and this determination may be used to reject authentication of the requesting electronic device 10 on the basis of this device identifier.

The memory 13 may comprise multiple sets of target memory segments resulting from induced errors (i.e. user-induced corrupt memory locations) with each set defining a separate device identifier. This further improves the security of the requesting electronic device 10, as the different device identifiers may be used for different authentication scenarios, e.g. gaining access to different remote electronic devices, binding different content, and so on, as will be explained further below.

In at least one embodiment, the device identifier is used as a fingerprint in the memory 13. The fingerprint is accessed during the execution of a verification task, e.g. some application or program, on the processor 11 of the requesting electronic device 10.

The execution of a verification task on the processor 11 of the requesting electronic device 10 causes the processor 11 to try and access corrupted memory locations. In at least one embodiment, when trying to access a corrupted memory location, the processor 11 will encounter some problem when accessing the look-up table of corrupted memory locations, which will cause the processor 11 to perform additional actions such as accessing the replacement memory location to access the required data.

At least some embodiments are based on the insight that such additional actions triggered by encountering corrupt memory locations can be also used as a device signature, as the number of additional actions triggered by the encountering of corrupt memory locations can be accurately controlled by creating corrupt memory locations, or at least flagging memory location as corrupted in the look-up table of corrupted memory locations and running a task such as a program on the processor 11 that forces the processor 11 to access a defined number of the memory locations of the memory 13 that are corrupted and/or marked as corrupted. The monitoring of the device behavior of the requesting electronic device 10 during execution of this task can be used as a device identifier generated by the requesting electronic device 10 for its authentication on the arbitrating electronic device 20. The device behavior of the requesting electronic device 10 during the execution of the access procedure may be the monitored deviation of the device behavior from 'ideal' device behavior (i.e. device behavior in the absence of corrupted memory locations). This execution behavior-based device identifier may be used as a stand-alone device identifier. Alternatively, the execution behavior-based device identifier may be used in combination with at least one of: (i) a device identifier based on the location, the number, and/or the source of error behind the target memory segments in an electronic device (i.e. the target memory segment-based device identifier, as described above); and (ii) user authentication information.

As previously explained, the corrupted memory locations may be created in the memory 13, e.g. during manufacture of the requesting electronic device 10 or may be created post-manufacture, e.g. created through an access procedure to be executed by the processor 11 to generate the device identifier. The creation of the corrupted memory locations and the generation of the device identifier will be in a manner such that it can be ensured that the task or program accesses the defined corrupt memory locations and the access generate the authentic device signature of the requesting electronic device 10. Alternatively, where the memory 13 of the requesting electronic device 10 cannot afford the introduction of fresh memory location defects, the device identifier generation may rely on pre-existing corrupt memory locations in the memory 13. The latter situation may occur because of the low-end nature of the requesting electronic device 10 or the age of the requesting electronic device 10 such that the memory 13 already contains a critical number of corrupt memory locations.

The strategy employed for the generation of the device identifier of the requesting electronic device 10 based on the access of selected corrupted memory location of the memory 13 during execution of a particular task or program by the processor 11 may be chosen based on a particular use case for the requesting electronic device 10.

An example first use case may be a situation with a low number of unique users or connecting electronic devices 10, 20 that communicate regularly with each other. Because of the low number of authenticating users/devices and the likely large amount of memory locations than can be modified, the system of the requesting electronic device 10 can corrupt memory locations or alter the corrupt memory location look-up table such that a repeatable and unique behavior becomes observable when the processor 11 is under a specific load, i.e. is executing an access procedure.

An example second use case may be a situation with a high number of unique users or requesting electronic devices 10 trying to connect to an arbitrating electronic device 20, such as authentication between a large number of (remote) employees connecting into a department server. Because of the high number of authenticating users/electronic devices 10 and the limited number of permitted unique modifications to memory locations of the memories 13 of the requesting electronic devices 10, a more limited number of memory locations may be corrupted or a more limited number of alterations may be made to the corrupt memory location look-up table such that a repeatable and unique behavior is observable when the processor 11 is under a specific load, i.e. is executing an access procedure.

An example third use case may be a situation in which low numbers of unique users or connecting electronic devices 10, 20 that communicate infrequently, with the requesting electronic devices 10 further having limited ability to further degrade the memory 13, e.g. because the requesting electronic device 10 is a low-end device and/or is several years old. Because of the low number of authenticating users/requesting electronic devices 10 and the age of the low-end requesting electronic device 10, the system of the electronic device 10 may prevent corruptions of the memory locations or alterations to the corrupt memory location look-up table and instead rely on a minimum threshold level of pre-existing errors in the memory 13 as explained above. In some embodiments, this approach is implemented by basing the authentication, at least in part, on whether a minimum threshold of memory degradation has occurred. For instance, the threshold level may be 271 corrupted sectors.

The system of the requesting electronic device 10 for instance may instead use the pre-existing corrupted memory locations of the memory 13 to create a hash key. The created hash key may be communicated to the arbitrating electronic device 20 for authenticating based on the hash key and/or may be embedded into the execution code of the access procedure to be executed by the processor 11 when generating the device identifier such that a resonant signature is created when the access procedure is executed. The hash key value may be used to influence the priority of the threads running on the processor 11 or to influence the default memory location search on the requesting electronic device 10 when performing a file search with the processor 11.

In an embodiment, the processor 11 may check if such a hash key can be generated with a sufficiently high confidence value indicating its uniqueness by comparing the number of corrupt memory locations in the memory 13 against a defined threshold. The hash key may be generated if the number of corrupt memory locations in the memory 13 exceeds the defined threshold, as in this scenario the memory 13 contains a sufficiently large number of corrupt memory locations, thus yielding a hash key having a high likelihood of being unique to the electronic device 10.

The look-up table identifying corrupted memory locations may identify different types of memory locations using appropriate binary codes, such as 11=Healthy location, 10=reserved location (not to be corrupted), 01=location corrupted during use, and 00=marked corrupted at manufacture. Such information may be used to select appropriate memory locations to be used in the generation of the device identifier of the electronic device 10 by monitoring the execution of a task or program on the processor 11 designed to access the selected corrupted memory locations.

In case of a Flash memory, memory locations may be corrupted by subjecting the memory location to a number of programming cycles that is sufficiently large to cause the memory location to fail, for example in excess of 10,000 programming cycles. However, it is not necessary to physically corrupt the memory location to create a target memory segment; instead, the look-up table listing corrupt memory locations may be altered to flag a selected memory location as being corrupt without actually corrupting the corresponding memory location.

The device behavior to be monitored during the task or program execution by the processor 11 of the electronic device 10 may be monitored in any suitable manner, e.g. using suitable sensors, by accessing log files, and so on. Such device monitoring is known in the art and will therefore not be explained in further detail for the sake of brevity only. Examples of parameters (i.e. execution behavioral properties) that may be monitored for the generation of the device identifier of the electronic device 10 during execution of the task or program by the processor 11 include but are not limited to the amount of electricity used by the electronic device 10, the amount of vibrations created by the electronic device 10, the amount of net heat generated by the processor 11, the number of operating system errors generated by the processor 11, duration of time that executing the execution of the access procedure takes 11, number of changes to a user interface associated with the electronic device 10, number of files accessed by the processor 11, duration of time that accessing a file by the processor 11 takes, the number of hardware operations performed by the requesting electronic device 10, any combination of one or more of those parameters, and any combination of one or more of those parameters and one or more of other parameters.

Figure 2:
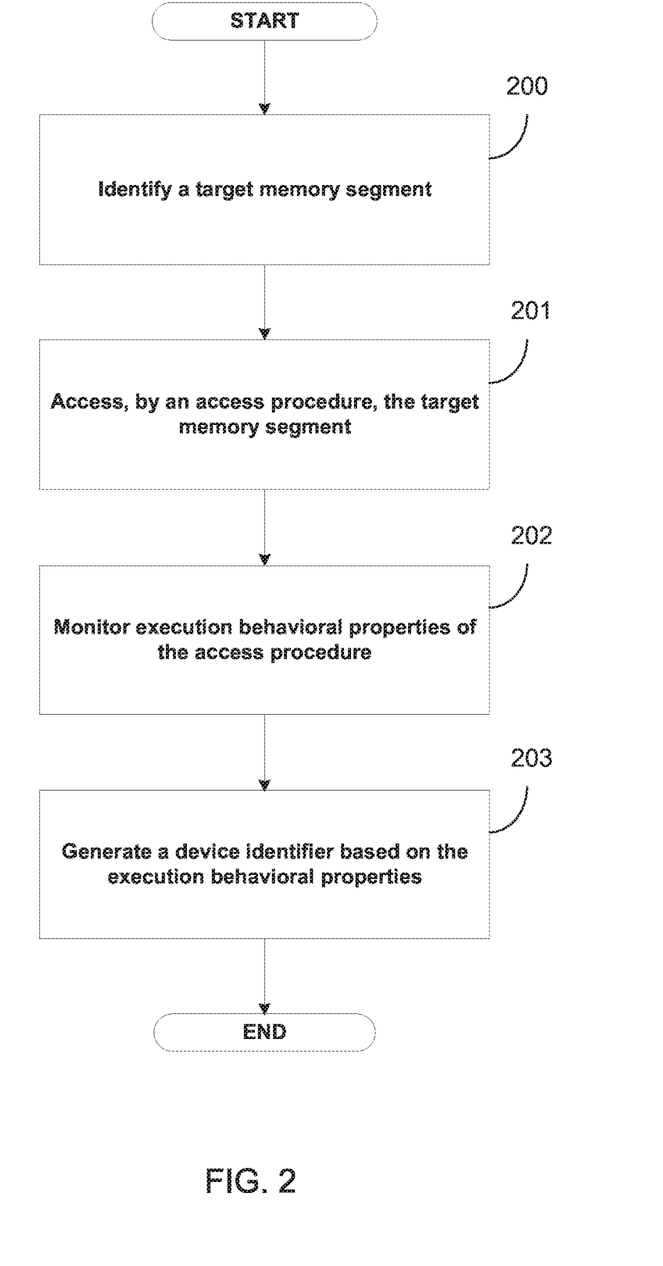
FIG. 2 is a flowchart diagram illustrating a device identification generation program, in accordance with at least one embodiment of the present invention.
Figure 3:
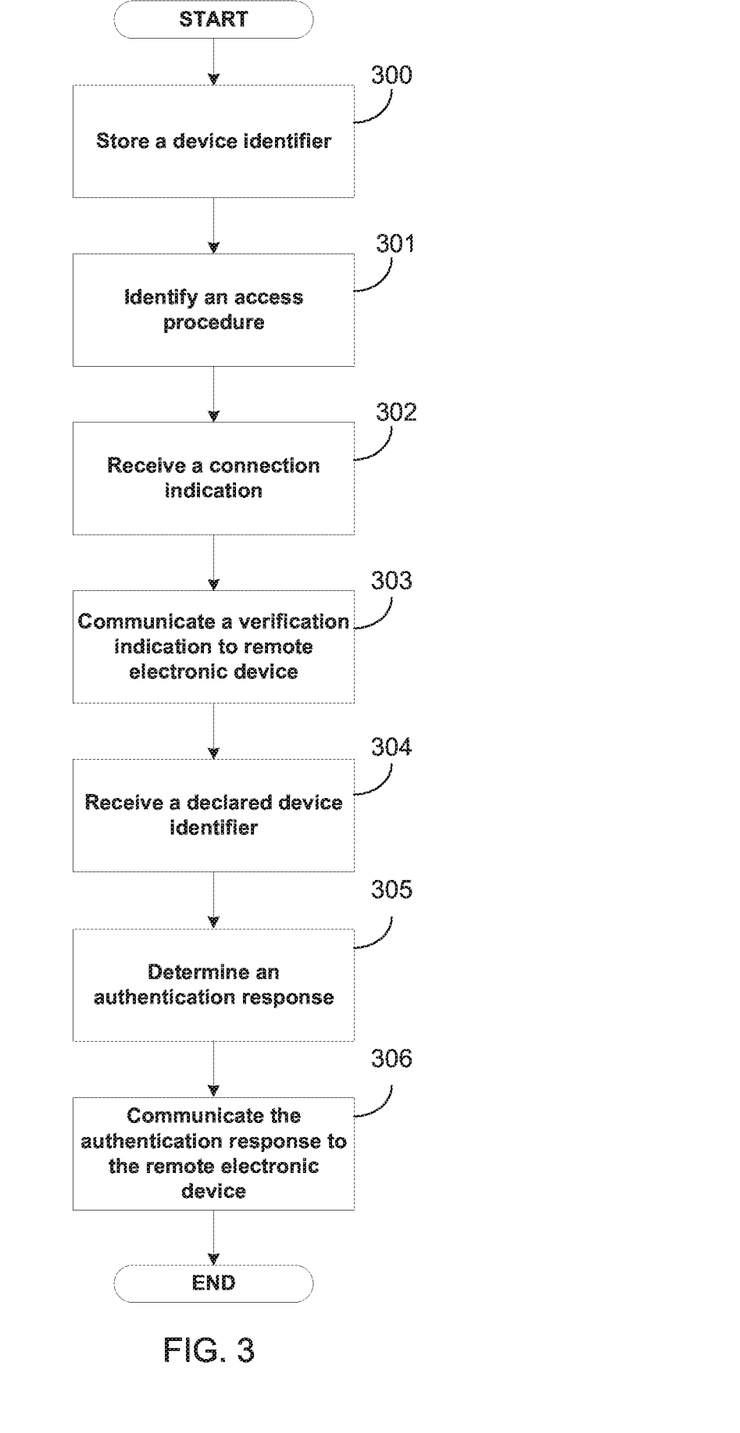
FIG. 3 is a flowchart diagram illustrating a device authentication program, in accordance with at least one embodiment of the present invention.

A user of the requesting electronic device 10 may attempt to connect to the arbitrating electronic device 20, e.g. to access data or resources stored on the arbitrating electronic device 20, to access services provided by the arbitrating electronic device 20, to request authentication of the electronic device 10 in case of the electronic device 20 hosting a registry, and so on. This connection attempt is handled by the arbitrating electronic device 20 by at least authenticating the electronic device 10. The generation of a device identifier for the requesting electronic device 10 and the authentication of the requesting electronic device 10 will now be explained in further detail with the aid of FIG. 2 and FIG. 3. FIG. 2 depicts a flowchart diagram of a device identification generation program for generating a device identifier for a requesting electronic device 10, in accordance with at least one embodiment of the present invention. FIG. 3 depicts a flowchart of a device authentication program for authenticating the requesting electronic device 10 by the arbitrating electronic device 20 based on the device identifier generated by the electronic device 10, in accordance with at least one embodiment of the present invention.

The device identification generation program generates an identifier for an electronic device. The electronic device comprises a processor and a memory. The memory is communicatively coupled to the processor and comprises a plurality of memory locations. At step 200, the program identifies a target memory segment. The target memory segment is a subset of the plurality of memory locations. At step 201, the program accesses, by an access procedure, the target memory segment. At step 202, the program monitors one or more execution behavioral properties associated with the execution of the access procedure. At Step 203, the program generates a device identifier based on the one or more execution behavioral properties.

In an exemplary embodiment, the memory 13 of the electronic device 10 may be a Flash memory having a number of corrupt memory locations, e.g. a number of corrupt Flash sectors. The device identification generation program executes an access procedure that comprises the step of accessing one or more of the corrupt Flash sectors, e.g. by inclusion of an algorithm accessing the selected corrupt Flash sectors one or more times. The execution of the access procedure on an electronic device 10 having a healthy Flash memory will generate 2 system calls and consume 1,002 mA of power by the processor 11. However, for an electronic device 10 having the preselected corrupt Flash memory sectors, the execution of the access procedure by the processor 11 of the electronic device 10 generates 182 system calls and the consumption of 4,061 mA of power. As explained above, many other device parameters (i.e. execution behavioral properties) may additionally or alternatively be monitored during the execution of the access procedure. The device identification generation program monitors those execution behavioral properties at step 202.

The device identification generation program uses the one or more monitored device parameters to generate a device identifier at step 203. The device identifier may comprise one or more of the monitored device parameter(s), a deviation of the monitored device parameter(s) from the expected, "ideal" values of the monitored device parameter(s) for an electronic device having a memory without corrupted memory locations or at least having an execution of the access procedure without encountering corrupted memory locations. In some embodiments, the device identifier may be a number of corrupt memory locations in all or part of the memory, or a value indicating whether the number of corrupt memory locations in all or part of the memory exceeds a predefined threshold (e.g. 300 memory locations). The program may process the observed device behavior, i.e. the observed device parameters during the execution of the access procedure by the processor, in any suitable manner to generate the device identifier or signature of the electronic device 10. In some embodiments, one or more execution behavioral properties are modified and/or ignored in generating the device identifier in all or some cases. For instance, in an exemplary embodiment, the amount of net heat generated by the processor will be ignored if the number of corrupt memory locations in the whole memory is below 200, but will be multiplied by 2 if the number of corrupt memory locations in the whole memory is above 300. In some embodiments, the device identification generation program transmits the device identifier to a remote electronic device, such as the arbitrating electronic device 20.

In some embodiments, the device identification generation program corrupts the target memory segment and the target memory segment comprises a subset of the plurality of the memory locations unique to the electronic device. In some of those embodiments, the target memory segment of one electronic device and another electronic device will not be the same with a predefined degree of confidence (e.g. 90 percent degree of confidence). In some of those embodiments, corrupting the target memory segment comprises exposing the target memory segment to one or more degrading programming cycles. In at least some of those embodiments, the program executes, often with heightened frequency, specific programming cycles known in the art to degrade and corrupt the memory on the electronic device to cause degradation and corruption of the electronic device. In some embodiments, the device identification generation program monitors the operation of the electronic device, identifies one or more memory locations in the plurality of memory locations that are unused or redundant, and marks those memory locations as corruptible. In some embodiments, further iterations of the program use corruptible memory locations to identify an access procedure comprising the step of accessing those memory locations and to generate a device identifier based on that access procedure.

In some embodiments of the present invention, the device identification generation program marks one or more memory locations in the target memory segment as corrupted in a memory corruption look-up table. In some embodiments, the device identifier denotes whether the number of memory locations in the target memory segment has exceeded a pre-defined threshold. In at least some of those embodiments, the program issues a binary "TRUE" device identifier if the number of corrupt memory segments exceeds a pre-defined threshold (e.g. 100 memory locations) and a binary "FALSE" device identifier if the number of corrupt memory segments does not exceed a pre-defined threshold. In some embodiments, the device identifier is the number of memory locations in the target memory segment.

In at least some of those embodiments, the program counts the number of memory locations determined to be corrupted and/or marked as corrupted and uses that number to generate a device identifier. In some embodiments, the memory comprises one or more flash memory units.

In some embodiments, the device identification generation program determines a corruption threshold indicator denoting whether the number of memory locations in said target memory segment has exceeded a pre-defined threshold and, responsive to the corruption threshold indicator, generates one or more supplemental device identifiers. In some embodiments, one or more supplemental device identifiers will only be generated if the corruption threshold indicator denotes that the number of corrupt memory locations in the target memory segment has exceeded a pre-defined threshold. In some embodiments, the program generates a hash value based on the properties of the target memory segment if the number of memory locations in the target memory segment exceeds a pre-defined threshold (e.g. 400 memory locations), as explained above. A supplemental device identifier may comprise one or more execution behavioral properties. A supplemental device identifier may comprise one or more values or properties generated based on properties of memory locations in one or more target memory segments or based on the access procedure used to generate a device identifier. A supplemental device identifier may comprise one or more authenticating information such as one or more passwords or one or more security question responses.

In some embodiments, the device identification generation program receives an execution indication from a remote electronic device, where the execution indication comprises a request for executing the access procedure. In some of those embodiments, the program transmits the device identifier to the remote electronic device. In some embodiments of the present invention, the execution behavioral properties that the program uses to generate the device identifier comprise at least one property from the group consisting of: (i) amount of electricity used by the electronic device; (ii) amount of vibrations created by the electronic device; (iii) amount of net heat generated by the processor; (iv) number of operating system errors generated by the processor; (v) duration of time that executing the access procedure takes; (vi) number of changes to a user interface associated with the electronic device; (vii) number of files accessed by the processor; (viii) duration of time that accessing a file by the processor takes; and (ix) number of hardware operations performed by the electronic device.

The device authentication program authenticates a remote electronic device. At step 300, the program stores a device identifier associated with a trusted electronic device. At step 301, the program identifies an access procedure associated with the device identifier. At step 302, the program receives a connection indication caused to be sent by remote electronic device comprising a request to connect to a resource as the trusted electronic device. At step 303, the program communicates a verification indication to the remote electronic device comprising a request for execution of the access procedure by the remote electronic device. At step 304, the program receives a declared device identifier comprising one or more pieces of execution behavioral of information associated with execution of the access procedure. At step 305, the program determines an authentication response denoting whether the device identifier and the declared device identifier are equivalent. At step 306, the program communicates the authentication response to the remote electronic device.

The device authentication program stores a device identifier associated with a trusted electronic device at step 300. In the embodiment depicted in FIG. 1, the arbitrating electronic device 20 stores the device identifier of the requesting electronic device 10 in the data storage device 25. In some embodiments, the device identifier only consists of one or more execution behavioral properties associated with execution of an access procedure, while in other embodiments the device identifier may comprise other authenticating information. The device identifier stored at step 300 may have been previously generated in any suitable manner, e.g. during a previous connection between the electronic devices 10 and 20 where the identity of the electronic device 10 was ensured in any suitable manner.

The device authentication program determines an authentication response based on whether the device identifier and the declared device identifier are compatible in step 305. In some embodiments, the device identifier and the declared device identifier are compatible if they contain the same values or data. In other embodiments, either or both of the device identifier or the declared device identifier need to undergo one or more pre-defined transformations before they are compared for equality. For instance, in one embodiment, the bits containing the declared device identifier will undergo a binary NOT operation before being compared to the bits containing the device identifier for equality. In some embodiments, the transformation of the device identifier and/or the declared device identifier will be, in part or in whole, determined based on the device identifier or the declared device identifier, or based on other values or data obtained directly or indirectly from the one or more electronic devices participating in the execution of the device authentication program. In some embodiments, one or more differences between the device identifier and the declared device identifier will be ignored based on the compatibility rules of the particular embodiment of the present invention and/or the electronic devices participating in the execution of the particular embodiment of the present invention.

The device authentication program communicates a verification indication to the remote electronic device comprising a request for execution of the access procedure by the remote electronic device at step 303. In some embodiments, the verification indication will further comprise a request for one or more pieces of additional information, such as one or more pieces of authenticating information or one or more pieces of identifying information generated based on the properties of memory locations in one or more target memory segments (e.g. a hash key determined based on the properties of memory locations in a target memory segment).

The device authentication program communicates the authentication response to the remote electronic device at step 306. In some embodiments, the program communicates the authentication response to the remote electronic device by granting or denying the remote electronic device access to its system or resources. In some of those embodiments, the program grants the remote electronic device access to its system or resources by establishing a connection between the electronic device and the remote electronic device if the authentication response denotes that the device identifier and the declared device identifier are equivalent, and denies such access if the authentication response denotes that the device identifier and the declared device identifier are not equivalent. In some embodiments, the program sends the remote electronic device an authentication signal indicating that the remote electronic device has been authenticated if the authentication response denotes that the device identifier and the declared device identifier are equivalent, and refuses to send such signal (or sends a refusal to authenticate signal indicating that the remote electronic device has not been authenticated) if the authentication response denotes that the device identifier and the declared device identifier are not compatible. This latter embodiment may be used in case of the electronic device implementing a registry.

In some embodiments, the device identifier comprises one or more supplemental device identifiers, where the one or more supplemental device identifiers comprise one or more supplemental elements selected from a group consisting of: (i) a component generated based on a subset of a plurality of memory locations of a memory of the trusted electronic device; and (ii) one or more pieces of user authentication information for a trusted user identity of the trusted electronic device. In addition, in those embodiments, the declared device identifier comprises one or more declared supplemental device identifiers, where the one or more supplemental device identifiers comprise one or more declared supplemental elements selected from a group consisting of: (i) a component generated based on a subset of a plurality of memory locations of a memory of the remote electronic device; and (ii) one or more pieces of user authentication information for a user identity of the remote electronic device.

In some embodiments, the device authentication program may not necessarily be used for all users of the electronic device. Instead, only the N most frequent users of the electronic device (with N being a positive integer) may be authenticated in this manner in order to limit authentication overhead. In some embodiments, the program may only be used when sensitive files are open or accessible to the users of the electronic device 20.

In some embodiments, the authentication process may be used to authorize the execution of content on the processor of the remote electronic device. For example, the processor may attempt to execute a program, access a media file or service, and so on, where such content is only authorized to be executed on a particular device or type of device, e.g. a particular model of the remote electronic device. In this scenario, the authenticating electronic device may implement a registry in which particular content is authorized for execution on devices by way of one or more of the above device identifiers, e.g. the fingerprint-based identifier of natural and/or induced corrupted memory locations and the execution behavior-based device identifier that is the result of the monitoring of the execution behavior of an access procedure on the processor of the remote electronic device, where the an access procedure is designed to access at least some of the corrupt memory locations defining the fingerprint-based device identifier of the remote electronic device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating an identifier for an electronic device, the method comprising:
   identifying, by one or more computer processors, a target memory segment;
   accessing, by the one or more computer processors, the target memory segment utilizing an access procedure;
   corrupting, by the one or more computer processors, the target memory segment, wherein the target memory segment includes a subset of a plurality of memory locations unique to an electronic device, wherein corrupting includes exposing the target memory segment to one or more degrading programming cycles with a heightened frequency to degrade and corrupt the target memory segment on the electronic device to cause degradation and corruption of the electronic device, identifying one or more memory locations in the plurality of memory locations that are unused, and marking the one or more memory locations as corruptible;
monitoring, by the one or more computer processors, one or more execution behavioral properties, the one or more execution behavioral properties being associated with execution of the access procedure; and
generating, by the one or more computer processors, a device identifier based, at least in part, on the one or more execution behavioral properties.

2. The method of claim 1, further comprising:
monitoring, by the one or more computer processors, operation of the electronic device;
identifying, by the one or more computer processors, one or more memory locations in the plurality of memory locations that are redundant; and
marking, by the one or more computer processors, the one or more memory locations as corruptible.

3. The method of claim 1, further comprising:
marking, by the one or more computer processors, one or more memory locations in the target memory segment as corrupted in a memory corruption look-up table.

4. The method of claim 1, wherein the device identifier denotes whether a number of memory locations in the target memory segment has exceeded a pre-defined threshold.

5. The method of claim 1, further comprising:
receiving, by the one or more computer processors, an execution indication from a remote electronic device, wherein the execution indication includes a request for executing the access procedure.

6. The method of claim 5, further comprising:
transmitting, by the one or more computer processors, the device identifier to the remote electronic device.

7. The method of claim 1, further comprising:
determining, by the one or more computer processors, a corruption threshold indicator, wherein the corruption threshold indicator denotes whether a number of memory locations in the target memory segment has exceeded a pre-defined threshold; and
responsive to the corruption threshold indicator exceeding the pre-defined threshold, generating, by the one or more computer processors, one or more supplemental device identifiers.

8. The method of claim 1, wherein each of the one or more execution behavioral properties comprises at least one property from a group consisting of:
an amount of electricity used by the electronic device;
an amount of vibrations created by the electronic device;
an amount of net heat generated by a processor on the electronic device;
a number of operating system errors generated by the processor on the electronic device;
a duration of time that executing the access procedure takes;
a number of changes to a user interface associated with the electronic device;
a number of files accessed by the processor on the electronic device;
a duration of time that accessing a file by the processor on the electronic device takes; and
a number of hardware operations performed by the electronic device.

9. A computer program product for generating an identifier for an electronic device, the computer program product comprising:
one or more computer-readable storage media and program instructions stored on the one or more computer-readable storage media, the program instructions comprising:
program instructions to identify a target memory segment;
program instructions to access the target memory segment utilizing an access procedure;
program instructions to corrupt the target memory segment, wherein the target memory segment includes a subset of a plurality of memory locations unique to an electronic device, wherein corrupting includes exposing the target memory segment to one or more degrading programming cycles with a heightened frequency to degrade and corrupt the target memory segment on the electronic device to cause degradation and corruption of the electronic device, identifying one or more memory locations in the plurality of memory locations that are unused, and marking the one or more memory locations as corruptible;
program instructions to monitor one or more execution behavioral properties, the one or more execution behavioral properties being associated with execution of the access procedure; and
program instructions to generate a device identifier based, at least in part, on the one or more execution behavioral properties.

10. The computer program product of claim 9, further comprising:
program instructions to monitor operation of the electronic device;
program instructions to identify one or more memory locations in the plurality of memory locations that are redundant; and
program instructions to mark the one or more memory locations as corruptible.

11. The computer program product of claim 9, further comprising:
program instructions to mark one or more memory locations in the target memory segment as corrupted in a memory corruption look-up table.

12. The computer program product of claim 9, wherein the device identifier denotes whether a number of memory locations in the target memory segment has exceeded a pre-defined threshold.

13. The computer program product of claim 9, further comprising:
program instructions to receive an execution indication from a remote electronic device, wherein the execution indication includes a request for executing the access procedure.

14. The computer program product of claim 13, further comprising:
program instructions to transmit the device identifier to the remote electronic device.

15. The computer program product of claim 9, further comprising:
program instructions to determine a corruption threshold indicator, wherein the corruption threshold indicator denotes whether a number of memory locations in the target memory segment has exceeded a pre-defined threshold; and
responsive to the corruption threshold indicator exceeding the pre-defined threshold, program instructions to generate one or more supplemental device identifiers.

16. The computer program product of claim 9, wherein each of the one or more execution behavioral properties comprises at least one property from a group consisting of:

an amount of electricity used by the electronic device;
an amount of vibrations created by the electronic device;
an amount of net heat generated by a processor on the electronic device;
a number of operating system errors generated by the processor on the electronic device;
a duration of time that executing the access procedure takes;
a number of changes to a user interface associated with the electronic device;
a number of files accessed by the processor on the electronic device;
a duration of time that accessing a file by the processor on the electronic device takes; and
a number of hardware operations performed by the electronic device.

17. A computer system for testing objects in a client-server environment, the computer system comprising:
one or more computer processors;
one or more computer-readable storage media; and
program instructions stored on the computer-readable storage media for execution by at least one of the one or more processors, the program instructions comprising:
program instructions to identify a target memory segment;
program instructions to access the target memory segment utilizing an access procedure;
program instructions to corrupt the target memory segment, wherein the target memory segment includes a subset of a plurality of memory locations unique to an electronic device, wherein corrupting includes exposing the target memory segment to one or more degrading programming cycles with a heightened frequency to degrade and corrupt the target memory segment on the electronic device to cause degradation and corruption of the electronic device, identifying one or more memory locations in the plurality of memory locations that are unused, and marking the one or more memory locations as corruptible;
program instructions to monitor one or more execution behavioral properties, the one or more execution behavioral properties being associated with execution of the access procedure; and
program instructions to generate a device identifier based, at least in part, on the one or more execution behavioral properties.

18. The computer system of claim 17, further comprising:
program instructions to monitor operation of the electronic device;
program instructions to identify one or more memory locations in the plurality of memory locations that are redundant; and
program instructions to mark the one or more memory locations as corruptible.

19. The computer system of claim 17, further comprising:
program instructions to mark one or more memory locations in the target memory segment as corrupted in a memory corruption look-up table.

20. The computer system of claim 17, wherein the device identifier denotes whether a number of memory locations in the target memory segment has exceeded a pre-defined threshold.

* * * * *